(12) United States Patent
Bitter (10) Patent No.: US 9,084,388 B2
(45) Date of Patent: Jul. 21, 2015

(54) HYDRAULIC SYSTEM

(75) Inventor: Marcus Bitter, Mannheim (DE)

(73) Assignee: DEERE & COMPANY, Moline, IL (US)

( * ) Notice: Subject to any disclaimer, the term of this patent is extended or adjusted under 35 U.S.C. 154(b) by 1147 days.

(21) Appl. No.: 13/076,643

(22) Filed: Mar. 31, 2011

(65) Prior Publication Data

US 2011/0252778 A1    Oct. 20, 2011

(30) Foreign Application Priority Data

Apr. 20, 2010    (DE) .......................... 10 2010 027 964

(51) Int. Cl.
*F15B 11/16*    (2006.01)
*A01B 63/10*    (2006.01)
*F15B 13/02*    (2006.01)

(52) U.S. Cl.
CPC ........... *A01B 63/1013* (2013.01); *F15B 11/162* (2013.01); *F15B 11/165* (2013.01); *F15B 13/022* (2013.01); *F15B 2211/20546* (2013.01); *F15B 2211/253* (2013.01); *F15B 2211/30535* (2013.01); *F15B 2211/4053* (2013.01); *F15B 2211/6054* (2013.01); *F15B 2211/6055* (2013.01); *F15B 2211/71* (2013.01); *F15B 2211/781* (2013.01)

(58) Field of Classification Search
CPC ............ B62D 5/07; B62D 5/09; B62D 5/075; F15B 2211/7142; F15B 2211/4053; F15B 2211/71; F15B 2211/20553; F15B 2211/428; F15B 2211/30535; F15B 2211/781; F15B 13/022; F15B 11/162
USPC .............. 91/516, 517, 518; 60/420, 422, 426, 60/445
See application file for complete search history.

(56) References Cited

U.S. PATENT DOCUMENTS

| | | | | | |
|---|---|---|---|---|---|
| 4,023,646 | A | * | 5/1977 | Heisig et al. ................... | 180/421 |
| 4,070,857 | A | * | 1/1978 | Wible .............................. | 60/422 |
| 4,617,854 | A | * | 10/1986 | Kropp .............................. | 91/517 |
| 4,665,939 | A | * | 5/1987 | Kreth et al. ..................... | 137/101 |
| 4,966,066 | A | * | 10/1990 | Kauss et al. ..................... | 91/516 |
| 5,315,829 | A | * | 5/1994 | Fischer ............................ | 60/456 |
| 6,644,025 | B1 | * | 11/2003 | Oberhausser et al. .......... | 60/422 |
| 7,788,916 | B2 | * | 9/2010 | Brockman et al. .............. | 60/427 |
| 2008/0202110 | A1 | * | 8/2008 | Keuper et al. ................... | 60/420 |

FOREIGN PATENT DOCUMENTS

| | | | | |
|---|---|---|---|---|
| DE | 202004010530 U1 | * | 1/2005 | |
| GB | 2224780 A | * | 5/1990 | |

OTHER PUBLICATIONS

DE202004010530U1 Machine translation of contents to English from espacenet. 2014.*

* cited by examiner

*Primary Examiner* — Edward Look
*Assistant Examiner* — Michael Quandt (57) ABSTRACT

For controlling supply priorities, a hydraulic system includes several loads, a pump, and a tank. One load has a first-level supply priority, and optionally a second load has a second-level supply priority subordinate to the first level. A third load has a third-level supply priority subordinate to the second level. Each load can be connected to the pump by a separate supply line. The supply lines for the first and the optional second load are connected to the pump by a common load-pressure-controlled priority valve and the supply line for the third load is connected to the pump by an additional load-pressure-controlled priority valve. A first load-pressure line leading to the pump is connected to a load-pressure line of the third hydraulic load and to a second load-pressure line.

14 Claims, 5 Drawing Sheets

HYDRAULIC SYSTEM

FIELD OF THE INVENTION

The present disclosure relates to a hydraulic system for controlling the supply priorities of several hydraulic loads.

BACKGROUND OF THE INVENTION

For hydraulic systems in agricultural vehicles, such as, e.g., in agricultural haulers or tractors, but also in harvesting machines, as well as construction and forestry equipment, it is known to provide load-pressure-dependent supplies for the individual hydraulic loads. Such systems, also known as load-sensing systems, can be operated both with fixed displacement pumps and also with variable displacement pumps regulated by feed-volume flow. For the use of fixed displacement pumps, a load-pressure-dependent supply is realized in that a fixed feed-volume flow is discharged by means of a discharge line as a function of the load pressure. In contrast, variable displacement pumps can be operated directly as a function of load pressure. It is further known to supply the hydraulic load on the mentioned vehicles in a priority-controlled way, so that, if there is a hydraulic undersupply due to operation, hydraulic loads with a higher priority level are preferentially supplied hydraulically relative to hydraulic loads with a lower priority level. Thus, hydraulic loads, such as, e.g., a hydraulically operated steering mechanism or hydraulically operated braking mechanisms belong to a higher priority level than, for example, a hydraulically operated linkage to the vehicle. This can belong, in turn, to a similarly higher priority level relative to another hydraulic load, for example, a lifting mechanism located on the vehicle. Thus, several priority levels are often to be taken into consideration for the different hydraulic loads in a load-pressure-dependent hydraulic system.

In order to realize reliable priority control, priority valves in the form of pressure regulators are used in hydraulic load-sensing systems, with these valves controlling a priority scale for supplying individual hydraulic loads in the case of a hydraulic undersupply of the overall system. As a rule, the individual hydraulic loads are each connected to at least one control valve by means of which a supply of the feed-volume flow on the side of the hydraulic pump is controlled. In the supply of each control valve there is a priority valve that is closed by a load-pressure signal of a preferential hydraulic load and reduces or throttles the volume flow, in order to guarantee the hydraulic supply of the preferential valves. For example, for realizing two priority levels in the hydraulic systems or arrangements known in the prior art, one priority valve is used. For the realization of three priority levels, as mentioned above, typically two priority valves are thus needed. In the known systems it is therefore disadvantageous that these are constructed and designed for a specified number of priority levels with, for the most part, also a specified number of hydraulic loads, that is, they are relatively inflexible and can be expanded or adapted afterward only with much effort. For example, should a hydraulic system with two priority levels later be expanded to one with an additional priority level, or should an additional hydraulic load be added to an existing priority level, then this is usually associated with considerable structural expense and increased structural volume. If this is to be avoided, then the system must be limited to a few, e.g., two priority levels and the otherwise different, subordinate hydraulic loads must be combined into one priority level. However, for an undersupply of the overall system, this could lead to the result that one of the combined hydraulic loads does not receive a sufficient volume flow supply and thus fails. This is especially disadvantageous when it involves a hydraulic load that should have an actually higher supply priority relative to a hydraulic load combined in the same priority level.

SUMMARY

According to an aspect of the present disclosure, a hydraulic system is constructed such that the supply lines for the first and optional second load can be connected to the hydraulic pump by means of a common load-pressure-controlled priority valve and the supply line for the third load can be connected to this hydraulic pump by means of an additional load-pressure-controlled priority valve and a first load-pressure line leading to the hydraulic pump is connected to a load-pressure line of the third hydraulic load and to a second load-pressure line. Therefore, because a common priority valve is provided for a first hydraulic load with a first supply priority and for a second hydraulic load with a second supply priority subordinate to the first priority, the second hydraulic load can be selectively added or removed, without having to realize significant assembly effort. An output provided for the second hydraulic load on the common priority valve can be closed when needed or selectively or can be connected to the optional second hydraulic load. Advantages of the hydraulic system according to the invention are produced especially in that, according to the invention, a modular, expandable, and thus variable hydraulic supply priority system is created that can be adapted easily to different type-approval requirements. Furthermore, proven hydraulic components and parts are used that generally run in large piece numbers and thus can be manufactured economically. Sometimes fewer components than for the equivalent conventional hydraulic supply priority systems are used, wherein fewer error sources are produced and a generally more robust design is realized. Through a smaller number of components, the hydraulic system can be formed in an easily constructed valve block and thus economically. Through the simple closing, for example, by means of a closure plug in the common priority valve, overall, fewer optional components are needed and thus the variety of parts is kept small, which has advantageous effects on logistics and handling in the production of such hydraulic systems. Under normal supply conditions for the hydraulic system, a volume flow fed by the hydraulic pump can be led by means of the common priority valve to the first and optional second load and by means of the additional priority valve to the third hydraulic load. In the case of an undersupply of the overall system, the additional priority valve closes due to a control by load-pressure lines and stops or reduces a volume flow flowing through the additional priority valve to the third hydraulic load, so that a larger volume flow comes to the benefit of the hydraulic loads controllable by means of the common priority valve. The first and optional second hydraulic loads are thus further supplied hydraulically independent of the position of the additional priority valve. In this way, if there is an undersupply of the overall system, a minimum supply of the first and optional second hydraulic loads is realized, wherein a pressure buildup for the first and optional second hydraulic load is made possible. The third hydraulic load is supplied with increasing closure of the additional priority valve with less and less volume flow; in contrast, the first and optional second hydraulic loads are further supplied with maximum volume flow. Thus, a higher supply priority is granted to the first and optional second hydraulic loads. An additional load-pressure-dependent control of the common priority valve ensures that a higher supply priority is given to the first hydraulic load relative to the optional second hydraulic load, wherein the optional second hydraulic load holds a higher supply priority relative to the third hydraulic load. Thus three priority levels are realized.

The common load-pressure-controlled priority valve could be constructed as a 3/2-port proportional control valve and represents a load-pressure-controlled or control-pressure-dependent pressure regulator. A different type of proportional valve could also be provided as long as it provides at least two outputs and can be connected on the output side to the supply line of the first load and to the supply line of the optional second load. The common priority valve can be controlled, on one hand, by means of a control-pressure line connected to a load-pressure line of the first load and, on the other hand, by means of a control-pressure line connected to the supply line of the first load, wherein the first control-pressure line controls the common priority valve in the direction of a closed position for the output of the optional second hydraulic load. The control-pressure line connected to the supply line of the first hydraulic load controls, in contrast, the common priority valve in the direction of an open position for the output of the optional second hydraulic load.

The first load-pressure line is connected by means of a first shuttle valve to the load-pressure line of the third hydraulic load and to the second load-pressure line, wherein the second load-pressure line is connected to the first and to the optional second hydraulic load. The shuttle valve is here arranged such that the first load-pressure line is attached on the output side. Thus, according to the supply state of the hydraulic system, the hydraulic pump controlled by means of the first load-pressure line can be controlled by means of the load pressure prevailing in the load-pressure line of the third load or by means of the load pressure prevailing in the second load-pressure line.

The second load-pressure line is connected to a load-pressure line of the at least one first load, so that according to the supply state and loading of the hydraulic system, a control of hydraulic pump can also take place as a function of the load pressure of the first load.

Furthermore, the second load-pressure line is also connected to a load-pressure line of the optional second load, as long as a second hydraulic load is used, but which optionally could also be provided selectively. In one such case, the second load-pressure line is connected by means of a second shuttle valve to the load-pressure lines of at least the first and optional second load, wherein the shuttle valve is connected on the output side to the second load-pressure line. Thus, according to the supply state of the hydraulic system, the hydraulic pump controlled by means of the first load-pressure line can be controlled by means of the load pressure prevailing in the load-pressure line of the third hydraulic load, the load pressure prevailing in the load-pressure line of the optional second hydraulic load or the load pressure prevailing in the load-pressure line of the first hydraulic load.

The additional priority valve by means of which a volume flow to the third hydraulic load can be controlled can be constructed as a 2/2-port proportional control valve in the form of a pressure regulator that is connected on the output side to the supply line of the third load, wherein the additional priority valve can be controlled, on one hand, by means of a control-pressure line connected to the second load-pressure line and, on the other hand, to the a control-pressure line connected, on the hydraulic-pump side, to the supply line of the third load. The control-pressure line connected to the second load-pressure line controls the priority valve in the direction of a closed position for the output of the third hydraulic load. In contrast, the control-pressure line connected on the hydraulic-pump side to the supply line of the third load controls in the direction of an open position. The priority valves constructed as proportional control valves could also assume, in addition to the mentioned two end positions (closed or open position), intermediate positions in which they open or close the appropriate output to the hydraulic load to a corresponding extent proportional to the control pressures acting on them.

In a different embodiment, a second first load could be provided that could be connected by means of the supply line for the at least one first load to the hydraulic pump. The second first load could be connected by means of the output of the common priority valve allocated to the first load or alternatively, on the hydraulic-pump side, before the common priority valve directly to the supply line of the at least one first load. The second first load thus has the same supply priority as the one first hydraulic load. Another load-pressure line is provided that is connected by means of a third shuttle valve, together with the load-pressure line of the one first load, to the second load-pressure line, wherein the connection to the second load-pressure line is arranged on the output side of the third shuttle valve, so that, in addition to that named above, both the load pressure of the one first load and also that of the second first load can prevail in the second load-pressure line, and the hydraulic pump can be controlled accordingly. Thus, overall, according to the supply state of the hydraulic system, the hydraulic pump can be controlled by means of the load pressure acting in the load-pressure line of the third hydraulic load, the load pressure in the load-pressure line of the optional second hydraulic load, the load pressure in the load-pressure line of the one first hydraulic load, or the load pressure in the load-pressure line of the second first hydraulic load, wherein the latter two hydraulic loads have the same supply priorities.

The hydraulic pump could be constructed as a load-pressure-dependent variable displacement pump that delivers a variable volume flow by means of an advantageously integrated feed-volume flow regulator as a function of the load-pressure signal required by the hydraulic load, wherein advantageously a resultant control pressure corresponding to the first load-pressure line can be used for regulating the variable displacement pump.

In one alternative embodiment, instead of the variable displacement pump, a fixed displacement pump could also be used as the hydraulic pump, wherein then a proportional control valve is provided that can be controlled as a function of load pressure and through which excess supply fluid fed from the fixed displacement pump is discharged to the hydraulic tank. By means of the first load-pressure line, the required supply quantity for the hydraulic load is also signaled here and as a function of this, a corresponding portion of the fixed volume flow fed by the fixed displacement pump is discharged by means of the proportional control valve into the hydraulic tank. In this way, a load-pressure-dependent feed volume can be provided to the hydraulic loads in a comparable way like with a variable displacement pump.

The at least one first hydraulic load can comprise, for example, a hydraulically actuatable steering mechanism or a hydraulically actuatable braking mechanism. Furthermore, it is also possible to operate other hydraulic loads as the at least one first load with highest priority level, for example, a hydraulically actuated gear.

Furthermore, the two could also be provided together in the same (highest) supply priority level with a second first hydraulic load. It is furthermore also possible to operate other hydraulic loads as the additional first load with highest priority level, for example, a hydraulically actuated gear.

A second hydraulic load could comprise, for example, a hydraulically actuatable suspension, wherein this could be, for example, a cabin suspension or else also an axle suspension of the vehicle. Furthermore, other hydraulic loads could also be operated as second loads with a subordinate priority level, in particular, those named above.

A third hydraulic load can comprise, for example, a hydraulically actuatable lifting mechanism, for example, with a three-point linkage device arranged on the front or back of the vehicle, or a front loader mounted on the vehicle. Furthermore, it is conceivable to operate those named above and also other different hydraulic loads in the different, mentioned supply priority levels, in particular, to replace one with another.

In order to prevent a loading of the control pressure for the hydraulic pump from entering into the first load-pressure line, a throttle device could be further provided that connects the first load-pressure line to the hydraulic tank. The provided throttle device by means of which the first load-pressure line is connected to the hydraulic tank could comprise, for example, a constant throttle or diaphragm or a diaphragm valve. Here, a variable or manual or electronically adjustable or controllable diaphragm valve or flow regulating valve or throttle regulating valve could also be used. Other means not named here for reducing the volume flow could also be used. It is essential that a minimum permissible volume flow could be specified in a preset or regulated or controlled way.

In order to prevent the first shuttle valve from closing the output of the third hydraulic load completely, the load-pressure lines of the at least one and/or second first and the optional second load can be connected to the hydraulic tank by means of a pressure-limiting valve, wherein pressure limiting is performed for the load-pressure lines. Such a hydraulic system is suitable for the use in agricultural vehicles, for example, agricultural haulers or tractors, but also in harvesting machines, as well as construction and forestry equipment.

DETAILED DESCRIPTION OF THE DRAWINGS

Figure 1:
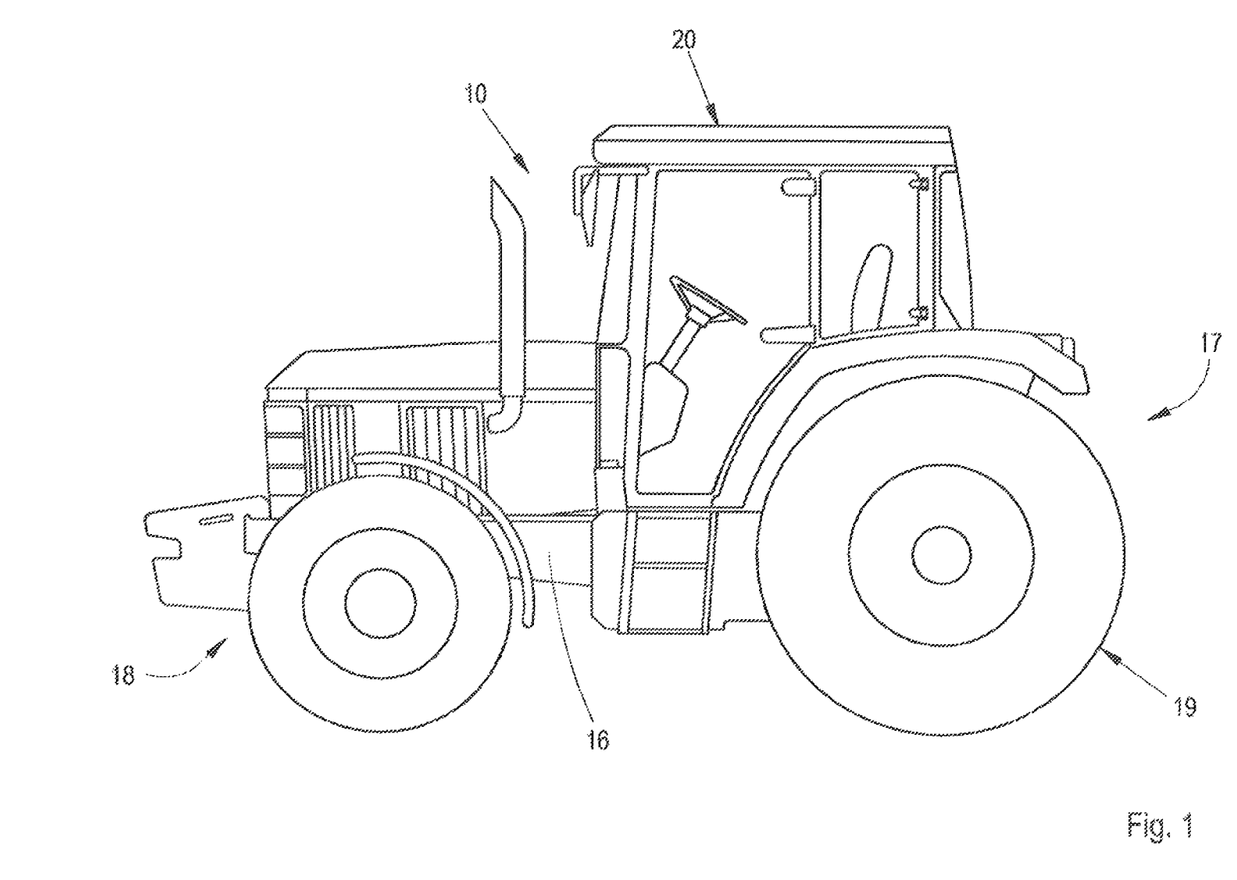
FIG. 1 is a schematic side view of an agricultural vehicle with a hydraulic system according to the invention.
Figure 2:
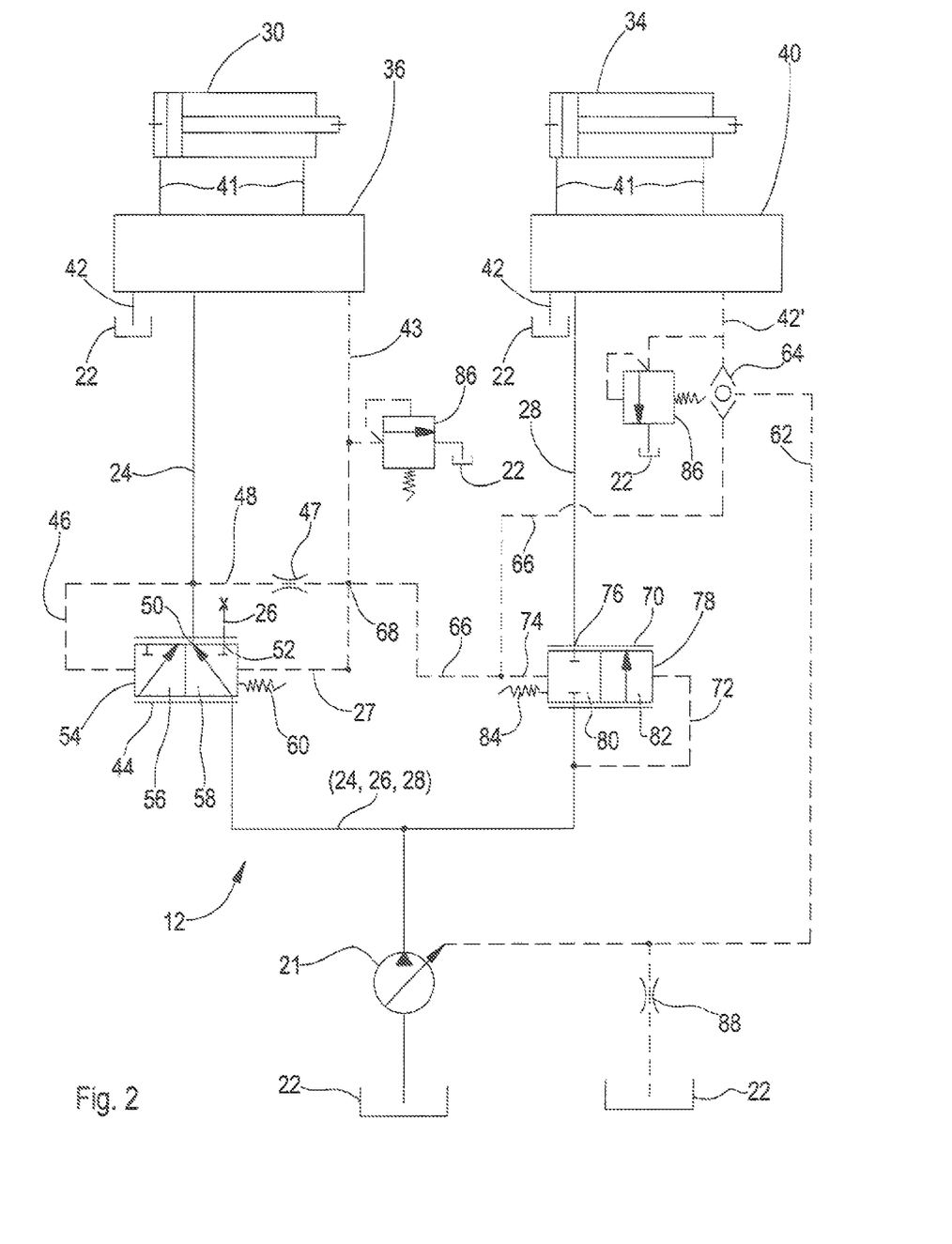
FIG. 2 is a schematic hydraulic circuit diagram of a hydraulic system according to the invention with two hydraulic loads of different supply priority.
Figure 3:
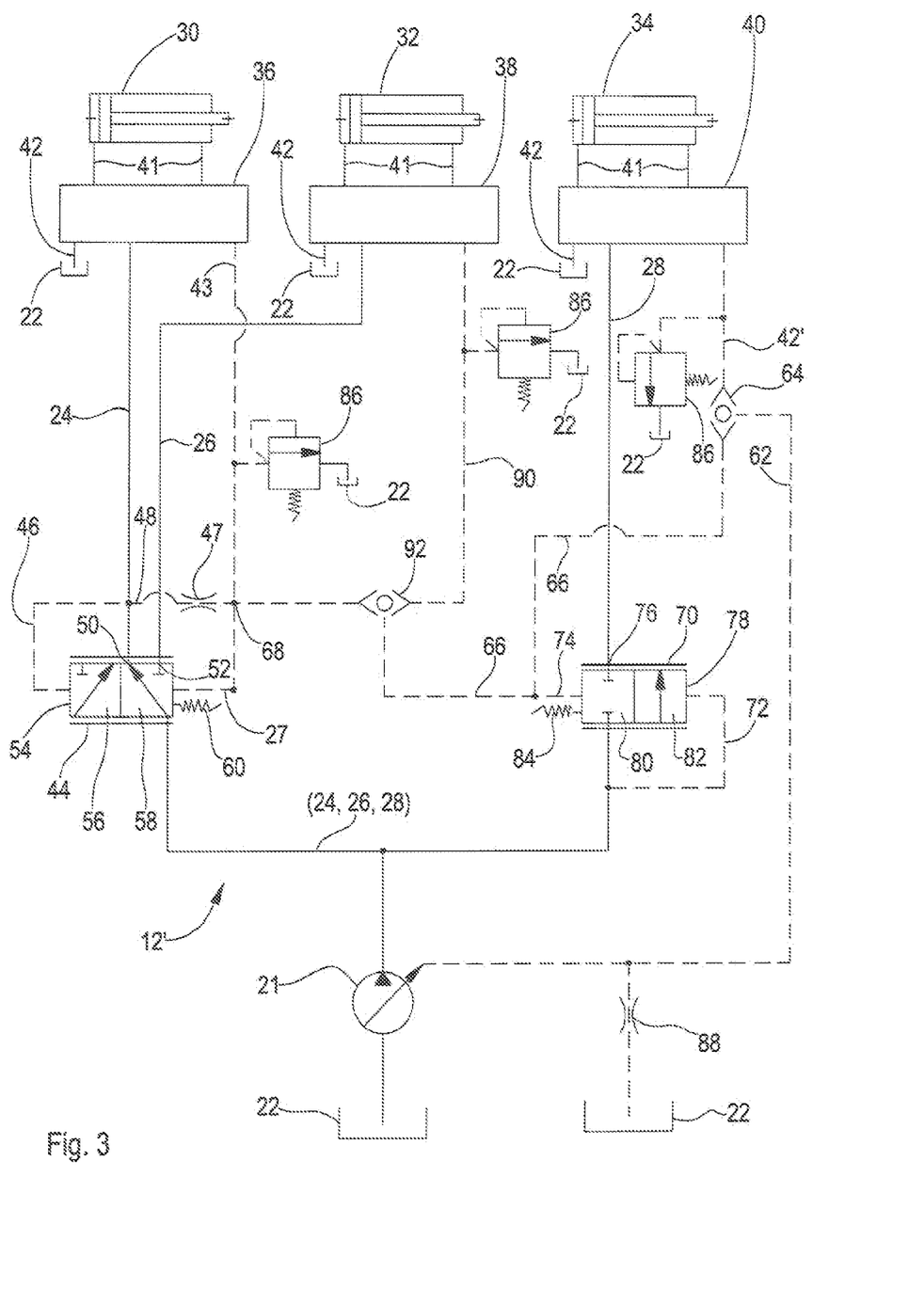
FIG. 3 is a schematic hydraulic circuit diagram of a hydraulic system according to the invention with three hydraulic loads of different supply priority.
Figure 4:
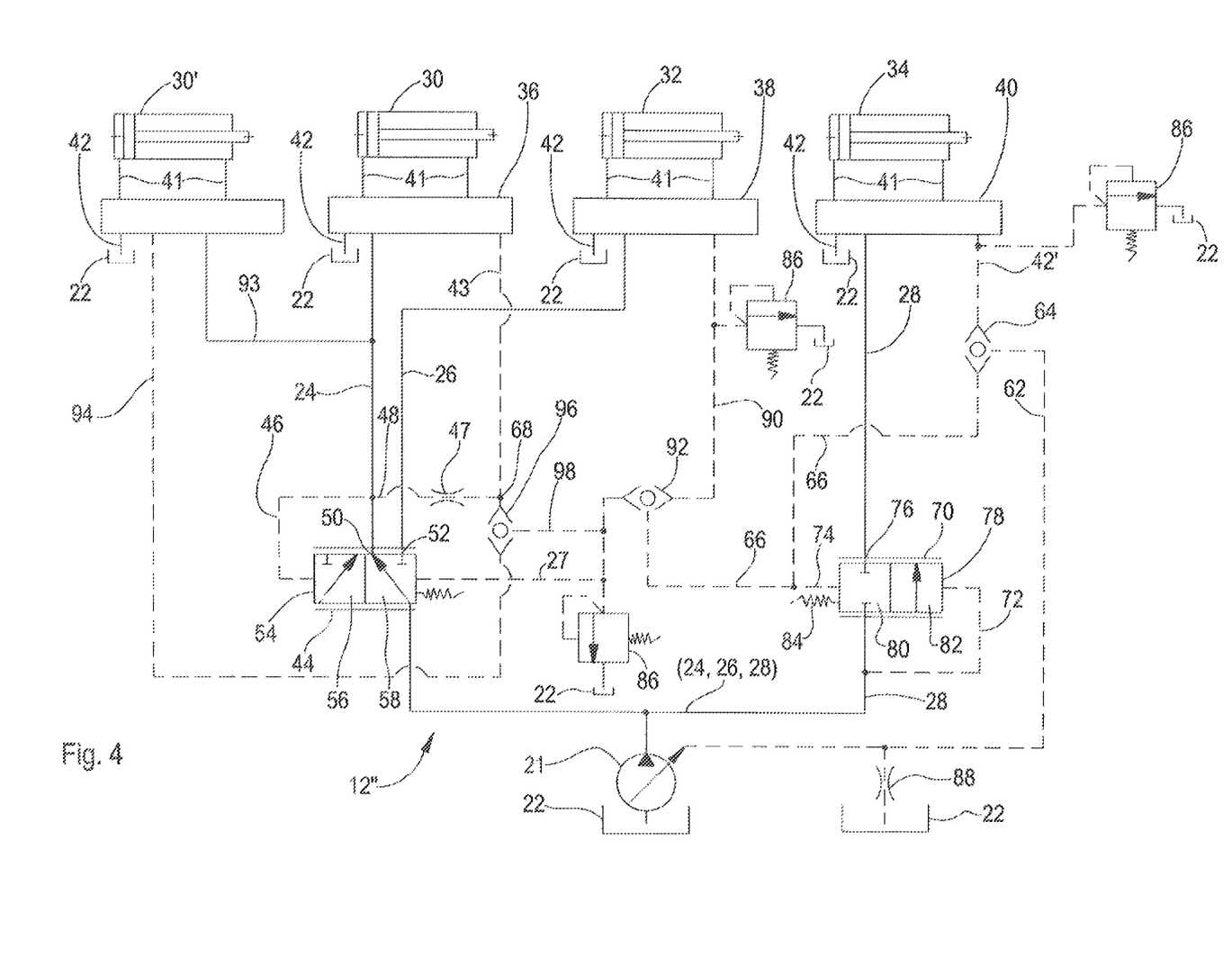
FIG. 4 is a schematic hydraulic circuit diagram of a hydraulic system according to the invention with four hydraulic loads with the same and different supply priority.

Referring to FIG. 1, an agricultural vehicle 10 in the form of a tractor or hauler includes a hydraulic system 12 according to FIGS. 2-4. The hydraulic systems shown schematically in FIGS. 2-3 are described only as examples in connection with the tractor and can also be used equally in other agricultural vehicles, such as harvesting machines, crop-protection machines, planting and sowing machines, but also in construction and forestry equipment.

The vehicle 10 includes a frame 16 on which is arranged, for example, on a rear region 17, a three-point linkage device (not shown) with lifting mechanism for operating trailer or work tools (not shown). The three-point linkage device could also be arranged equally on a front region of the vehicle 10. The lifting mechanism arranged on the three-point linkage device is supplied as one of several hydraulic loads located on the vehicle 10 by means of the hydraulic system 12. The hydraulic systems 12 shown in FIGS. 2-4 could also supply, furthermore, hydraulically operated devices on the vehicle 10, with these devices not being named in detail here. As examples, only a front loader or a hydraulically operated work tool pulled by means of a tow bar shall be named here.

Furthermore, the vehicle 10 has available a hydraulically operated steering mechanism and brake mechanism (both not shown), as well as a hydraulically operated suspension system on the front axle 18, rear axle 19, and/or cabin 20.

According to FIG. 2, an embodiment according to the invention for only two hydraulic loads with different supply priorities is shown. The hydraulic system 12 according to FIG. 2 includes a hydraulic pump 21 in the form of a variable displacement pump and a hydraulic reservoir 22 in the form of a hydraulic tank with hydraulic fluid.

The hydraulic system 12 further includes first, second, and third hydraulic supply lines 24, 26, 28 that are connected to the hydraulic pump 21 and hydraulically supply the at least one first, optional second, and third hydraulic loads 30, 32, 34, wherein the supply line 26 for the optional second hydraulic load 32 (see FIGS. 3-4) is indeed provided in FIG. 2 as an example, but is shown closed and becomes a functional component only in the embodiments shown in FIGS. 3-4, because for the embodiment shown in FIG. 2, no optional second hydraulic load 32 is provided. The hydraulic loads 30, 32, 34 are controlled by means of a first, second, and third control valve 36, 38, 40 (see FIGS. 3-4 for control valve 38 for optional second load 32). The control valves 36, 38, 40 are each connected by means of one of the supply lines 24, 26, 28 to the hydraulic pump 21 and by means of several different connection lines 41 to the corresponding hydraulic load 30, 32, 34, as well as by means of tank lines 42 to the hydraulic tank 22. The one first hydraulic load 30 is consequently supplied by means of the first supply line 24 and controlled by means of the control valve 36. The third hydraulic load 34 is consequently supplied by means of the supply line 28 and controlled by means of the control valve 40.

Each of the hydraulic loads 30, 32, 34 can involve more than only one hydraulic load, so that, for example, the first hydraulic load 30 can represent a hydraulically operated steering mechanism (not shown) and/or brake mechanism (not shown) of the vehicle 10. The hydraulic loads, however, could also be, in all of the shown examples, both a hydraulically operated suspension (not shown) of the vehicle frame 16 and the front axle 18 and/or on the rear axle 19 and/or also a hydraulic suspension (not shown) of the cabin 20, and also a lifting mechanism of a three-point linkage device (not shown) or of a front loader. Here, the hydraulic loads 30, 32, 34 could also represent other not-named hydraulic loads and could also be constructed in other arbitrary sequences with arbitrary supply priorities.

The first control valve 36 has a load-pressure line 43 that opens as control-pressure line 27 into a proportional control valve 44 constructed as a 3/2-port directional control valve that represents a common priority valve 44 for the first and optional second hydraulic load. From the opposite control-pressure side of the common priority valve 44, a control-pressure line 46 extends that opens into the supply line 24, wherein a load-pressure connection line 48 provided with a throttle or diaphragm 47 is further provided, with this connection line extending between the supply line 24 and the load-pressure line 43. The common priority valve 44 has two outputs 50, 52 whose opening cross sections expand or decrease, that is, are opened or closed, according to the load-pressure-controlled movement (by the control-pressure lines 43, 46) of a valve slide 54 with corresponding valve-slide position 56, 58, wherein a movement of the valve slide 54 caused by the control-pressure line 46 in the direction of the valve-slide position 56 closes the opening cross section of the output 50 or opens that of the output 52 and a movement of the valve slide 54 caused by the control-pressure line 43 in the direction of the valve-slide position 58 opens the opening cross section of the output 50 or closes that of the output 52. Furthermore, the common priority valve 44 is biased with a spring 60 that forces the valve slide into the last-named valve-slide position 58, so that for possible control-pressure loss or control-pressure stoppage, a supply of the at least one first hydraulic load 30 is ensured.

Starting from the hydraulic pump 21, a first load-pressure line 62 extends, wherein this load-pressure line is constructed as a control-pressure line for the hydraulic pump 21 and opens on the output side of a first shuttle valve 64. The first shuttle valve 64 is connected on the input side to a load-pressure line 42' of the third hydraulic load 34 and also to a second load-pressure line 66. The second load-pressure line 66 opens, in turn, into a connection 68 with the load-pressure line 43 of the at least one hydraulic load 30.

For the hydraulic supply control of the third hydraulic load 34, another priority valve 70 is provided that is constructed as a 2/2-port proportional control valve. A control-pressure line 72 is connected to the supply line 28 on the side of the hydraulic pump. From the opposite control-pressure side of the additional priority valve 70, a control-pressure line 74 extends that is in connection with the second load-pressure line 66. The additional priority valve 70 has an output 76 whose opening cross section expands or decreases, that is, opens or closes, according to the load-pressure-controlled movement (by the control-pressure lines 72, 74) of a valve slide 78 with corresponding valve-slide position 80, 82, wherein a movement of the valve slide 78 caused by the control-pressure line 74 in the direction of the valve-slide position 80 closes the opening cross section of the output 76 and a movement of the valve slide 78 caused by the control-pressure line 72 in the direction of the valve-slide position 82 opens the opening cross section of the output 76. Furthermore, the additional valve 70 is biased with a spring 84 that forces the valve slide into the last-named valve-slide position 80, so that for possible control-pressure loss or control-pressure stoppage, an interrupt of the supply of the third hydraulic load 34 is ensured.

In order to prevent excess pressure in the load-pressure lines 42', 43, these are advantageously connected by means of pressure-limiting valves 86 to the hydraulic tank 22.

Furthermore, from the first load-pressure line 62 a connection line provided with a throttle or diaphragm 88 to the hydraulic tank 22 is provided, in order, on one hand, to guarantee a sufficient control-pressure buildup for the hydraulic pump 21 in the first load-pressure line 62 and, on the other hand, to prevent a fixing of a control pressure for the hydraulic pump 21 in the first load-pressure line 62 or to allow a control-pressure reduction or release in the first load-pressure line 62. Depending on the type of construction, however, this arrangement for the control-pressure reduction or release is not absolutely required for each type of hydraulic load.

Through the described hydraulic system 12 according to FIG. 2, a load-pressure-controlled hydraulic system 12 with integrated priority control for hydraulic loads 30, 34 with two different supply priorities is created, wherein an additional hydraulic load 32 with an additional supply priority level that is lower than the first and higher than the third is not attached (attachment 52 to the first priority valve 44 is closed). In the present case, priority control means that the different hydraulic loads 30, 34 are allocated to different importance levels or priority levels and are supplied from the hydraulic pump 21 according to their priority level with a corresponding supply priority. This means that for an undersupply of the overall system or the hydraulic system 12, which can occur depending on operation, the hydraulic loads 34 of a lower priority level are no longer supplied hydraulically or only to a limited extent, in order to guarantee a continued, complete hydraulic supply of hydraulic loads 30 of higher priority levels.

One embodiment for another hydraulic system 12' with three hydraulic loads 30, 32, 34 is shown in FIG. 3, wherein now the second hydraulic load 32 was selectively added such that an uppermost supply priority was allocated to the first hydraulic load 30, a middle supply priority was allocated to the second hydraulic load 32, and the lowest supply priority was allocated to the third hydraulic load 34. The optional second hydraulic load 32 has a load-pressure line 90 that is connected by means of a second shuttle valve 92 to the load-pressure line 43 of the one first hydraulic load 30 and to the second load-pressure line 66, wherein the second load-pressure line 66 is attached on the output side to the shuttle valve 92. Furthermore, the load-pressure line 90 of the optional second hydraulic load 32 is also connected by means of a pressure-limiting valve 86 to the hydraulic tank 22 for the same reasons as described above. Incidentally, the hydraulic system 12' from FIG. 3 is equivalent to the hydraulic system 12 from FIG. 2.

An embodiment for an additional hydraulic system 12" with four hydraulic loads 30, 30', 32, 34 is shown in FIG. 4, wherein, in addition to the optional second hydraulic load 32, a second (additional) first hydraulic load 30' (as an overall fourth hydraulic load) was added, so that an uppermost supply priority was allocated to the first hydraulic load 30 and to the second first load 30', a middle supply priority was allocated to the optional second hydraulic load 32, and the lowest supply priority was allocated to the third hydraulic load 34. The second first load 30' has a supply line 93 coupled to the supply line 24 of the one first load 30 and also a load-pressure line 94 that is connected by means of a third shuttle valve 96 to the load-pressure line 43 of the one first hydraulic load 30 and to the second load-pressure line 66, wherein the third shuttle valve 96 is arranged such that a load-pressure connection line 98 leads, on the output side of the third shuttle valve 96, to one of the inputs of the second shuttle valve 92. The coupling of the supply line 93 to the supply line 24 can be realized starting from the hydraulic pump 21 both in front of and also behind the common priority valve 44, wherein the latter alternative is shown as an example in FIG. 4. Furthermore, the load-pressure lines 43 and 94 are connected in common by means of a pressure-limiting valve 86 for the same reasons as described above to the hydraulic tank 22. Incidentally, the hydraulic system 12" from FIG. 4 is equivalent to the hydraulic system 12' from FIG. 3. The expansion by a second first hydraulic load 30' can obviously also be realized starting from the hydraulic system 12 according to FIG. 2, wherein then the second shuttle valve 92 would be left out. It is equally conceivable that also other hydraulic loads (not shown) could be added into the other supply priority levels, such that an additional, optional second or an additional third load could be added in an analogous way, as was described above for the second first hydraulic load 30'.

The preceding embodiments show that an expansion of a hydraulic system 12 according to the invention by an additional hydraulic load 32 with an additional supply priority level (arrangement 12'), as well as an expansion of an arrangement 12 or 12' according to the invention by a second (additional) first hydraulic load 30' can be realized with little assembly effort and in a simple way by the additional/removal of one shuttle valve (92, 96) or connection/disconnection of the corresponding supply line (26, 93).

In the present embodiments according to FIGS. 2, 3, and 4, different supply priorities were allocated to the hydraulic loads 30, 30', 32, 34, such that, if it should come to an operation-related undersupply of the hydraulic system 12, 12', 12", then primarily it is guaranteed that the one first hydraulic load 30 and optionally also the second first hydraulic load 30' continue to be adequately supplied and only then is a hydraulic supply of the second and possibly also the third hydraulic load 32, 34 realized. This could be achieved as follows based on the described arrangement of the load-pressure lines 43, 48, 62, 66, 90, 94, 98 and also the shuttle valves 64, 92, 96 and the control-pressure lines 46, 72, 74 in connection with the priority valves 44, 70.

Under normal supply conditions for the overall system or for the hydraulic systems 12, 12', 12", a volume flow fed by the hydraulic pump 21 can be led freely by means of another priority valve 70 (shown in the closed position in FIGS. 2-4) opened by the control-pressure line 72 to the third hydraulic load 34. Furthermore, the one first and possibly the second first, as well as the optional second hydraulic loads 30, 30', 32 are supplied by means of the common priority valve 44 opened for both outputs 50, 52 by the control-pressure line 27 and the control-pressure line 46 or load-pressure connection line 48. In the case of an undersupply of the overall system, the load pressure in the load-pressure lines 66, 90 increases, viewed relatively, because a supply pressure of the overall system drops, and due to their connection to the control-pressure line 74, a complete or partial closing of the priority valve 70 (or pressure regulator) is realized, wherein a volume flow to the third load 34 is stopped or reduced (throttled). Simultaneously, the volume flow for the one first and possible second first, as well as for the optional second hydraulic loads 30, 30', 32 are further guaranteed by means of the common priority valve 44. The one first and possible second first, as well as the optional second hydraulic loads 30, 30', 32 are thus further supplied hydraulically independent of the position of the additional priority valve 70, even if the additional priority valve 70 should be completely closed, and also with a throttled volume flow. Thus, for an undersupply of the overall system, there is a minimum supply of the one first and possible second first, as well as the optional second hydraulic load 30, 30', 32.

With increasing closure of the additional priority valve 70, the third hydraulic load 34 is supplied with less and less volume flow; in contrast, the one first hydraulic load 30 and optionally also the second first load 30' are further supplied with the maximum volume flow. Should there be an even larger undersupply, due to the rising pressure in the load-pressure line 43 or control-pressure line 27, the common priority valve 44 increasingly closes with respect to its output 52 for the optional second hydraulic load 32, so that for a larger undersupply, only the output 50 is still open for the one first and possible second first hydraulic load. The hydraulic loads 30, 30', 32, 34 shown in FIGS. 2-4 are shown as hydraulic cylinders. However, they should symbolize a plurality of possible hydraulic loads purely as examples. For example, the one first load 30 and optional second first load 30' can equally represent a hydraulic steering mechanism or brake mechanism that has a higher supply priority relative to a hydraulic suspension constructed as another second hydraulic load 32 for the vehicle 10 or cabin 20. Furthermore, for example, a hydraulic suspension constructed as an optional second hydraulic load 32 for a vehicle or a cabin 20 can have a higher supply priority relative to a lifting mechanism constructed as a third hydraulic load 34.

Figure 5:
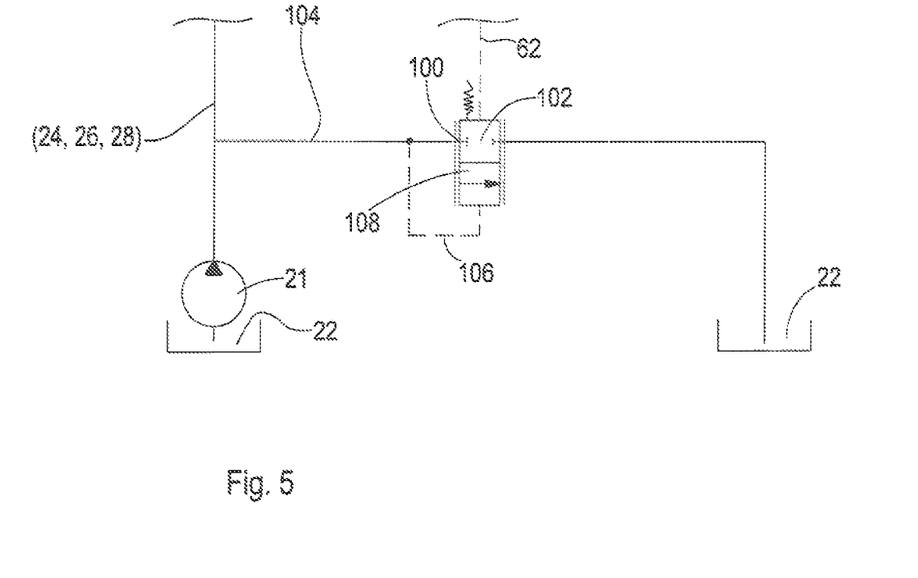
FIG. 5 is a schematic hydraulic circuit diagram of a hydraulic system with a fixed displacement pump.

Even though the invention has been described merely with reference to only three embodiments, in light of the preceding description and also the drawings, many different alternatives, modifications, and variants that fall under the present invention present themselves to someone skilled in the art. Thus, according to FIG. 5, for example, instead of the variable displacement pump, a fixed displacement pump could be arranged as hydraulic pump 21, wherein a load-pressure-dependent, demand-driven hydraulic system 12, 12', 12" according to FIGS. 2-4 can then be realized by means of an additional pressure-controlled proportional control valve 100 that is forced by the first load-pressure line 62 in a pressure-controlled way into a closed position 102 and by a control-pressure line 106 connected to a discharge line 104 into an open position 108. The discharge line 104 is connected to the feed-volume flow of the hydraulic pump 21 constructed as a fixed displacement pump and reduces the feed volume corresponding to the load-pressure signal delivered by the first load-pressure line 62 by means of discharging excess supply fluid (hydraulic fluid fed from the hydraulic pump 21) that is fed by the fixed displacement pump constantly to the supply lines 24, 26, 28. In this way, a demand-driven or load-pressure-dependent supply of the hydraulic loads 30, 30', 32, 34 can also be performed by means of a hydraulic pump 21 constructed as a fixed displacement pump.

While the disclosure has been illustrated and described in detail in the drawings and foregoing description, such illustration and description is to be considered as exemplary and not restrictive in character, it being understood that illustrative embodiments have been shown and described and that all changes and modifications that come within the spirit of the disclosure are desired to be protected. It will be noted that alternative embodiments of the present disclosure may not include all of the features described yet still benefit from at least some of the advantages of such features. Those of ordinary skill in the art may readily devise their own implementations that incorporate one or more of the features of the present disclosure and fall within the spirit and scope of the present invention as defined by the appended claims.

I claim:

1. A hydraulic system for controlling the supply priorities of several hydraulic loads, with a hydraulic pump and a hydraulic tank, at least one first hydraulic load with a first-level supply priority, a second hydraulic load with a second-level supply priority subordinate to the first level, a third hydraulic load with a third-level supply priority subordinate to the second level, wherein each load can be connected hydraulically to the hydraulic pump by a separate supply line, characterized by:

supply lines for the first and the second loads are connected to the hydraulic pump by a common load-pressure-controlled priority valve, and the supply line for the third load is connected to the hydraulic pump by an additional load-pressure-controlled priority valve, and a first load-pressure line leading to the hydraulic pump is connected to a load-pressure line of the third hydraulic load and to a second load-pressure line, the priority valves are connected in parallel and each priority valve has an inlet port connected directly to the pump.

2. The hydraulic system of claim 1, wherein:

the common load-pressure-controlled priority valve is a 3/2-port proportional control valve that is connected on an output side to the supply line of the first load and to the supply line of the second load, wherein the common priority valve is controlled by a control-pressure line connected to a load-pressure line of the first load and by a control-pressure line connected to the supply line of the first load.

3. The hydraulic system of claim 1, wherein:
the first load-pressure line is connected by means of a first shuttle valve to the load-pressure line of the third hydraulic load and to the second load-pressure line, wherein the second load-pressure line is connected to the first and to the optional second hydraulic load.

4. The hydraulic system of claim 1, wherein:
the second load-pressure line is connected to a load-pressure line of the at least one first load.

5. The hydraulic system of claim 1, wherein:
the second load-pressure line is connected to a load-pressure line of the second load, wherein the second load-pressure line is connected by a shuttle valve to the load-pressure lines of at least the first load and the second load.

6. The hydraulic system of claim 1, wherein:
the additional priority valve is a 2/2-port proportional control valve which has an output side connected to the supply line of the third load, and the additional priority valve is controlled by means a control-pressure line connected to the second load-pressure line and by a control-pressure line connected, on a hydraulic-pump side, to the supply line of the third load.

7. The hydraulic system of claim 1, wherein:
a further load is connected to the hydraulic pump by the supply line for the first load and a further load-pressure line is connected to the second load-pressure line by a shuttle valve, together with the load-pressure line of the one first load.

8. The hydraulic system of claim 7, wherein:
the further load comprises a hydraulically actuatable steering mechanism.

9. The hydraulic system of claim 7, wherein:
the further load comprises a hydraulically actuatable brake mechanism.

10. The hydraulic system of claim 1, wherein:
the hydraulic pump is a load-pressure-dependent variable displacement pump.

11. The hydraulic system of claim 1, wherein:
the second load comprises a hydraulically actuatable linkage or a hydraulically actuatable lifting mechanism.

12. The hydraulic system of claim 1, further comprising:
a throttle device which connects the first load-pressure line to the hydraulic tank.

13. The hydraulic system of claim 1, wherein:
at least one of the load-pressure lines is connected to the hydraulic tank by a pressure-limiting valve.

14. The hydraulic system of claim 1, wherein:
the third load comprises a hydraulically actuatable linkage or a hydraulically actuatable lifting mechanism.

\* \* \* \* \*